US008265680B2

(12) United States Patent
Choi et al.

(10) Patent No.: US 8,265,680 B2
(45) Date of Patent: Sep. 11, 2012

(54) APPARATUS AND METHOD FOR POWER ALLOCATION IN MOBILE COMMUNICATION SYSTEM

(75) Inventors: Ji-Hoon Choi, Seoul (KR); Sung-Kwon Jo, Suwon-si (KR); Jun-Sang Lee, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 1023 days.

(21) Appl. No.: 12/029,768

(22) Filed: Feb. 12, 2008

(65) Prior Publication Data

US 2008/0194284 A1     Aug. 14, 2008

(30) Foreign Application Priority Data

Feb. 12, 2007   (KR) .................. 10-2007-0014254

(51) Int. Cl.
    *H04B 7/00*    (2006.01)

(52) U.S. Cl. ............ 455/522; 455/69; 455/70; 455/450; 455/451; 455/453; 370/318; 370/319; 370/320

(58) Field of Classification Search .................. 455/522, 455/69–70, 450–455; 370/318–320
    See application file for complete search history.

(56) References Cited

U.S. PATENT DOCUMENTS

| 7,447,516 B2* | 11/2008 | Heo et al. .................. 455/522 |
| 2001/0012785 A1* | 8/2001 | Esteves et al. .............. 455/522 |
| 2004/0198404 A1* | 10/2004 | Attar et al. ................. 455/522 |
| 2006/0003787 A1* | 1/2006 | Heo et al. .................. 455/522 |
| 2007/0127407 A1* | 6/2007 | Attar et al. ................. 370/318 |

FOREIGN PATENT DOCUMENTS

| JP | 2003-008504 | 1/2003 |
| KR | 1020050118086 | 12/2005 |
| KR | 1020070089287 | 8/2007 |
| KR | 1020080056920 | 6/2008 |

* cited by examiner

*Primary Examiner* — Fayyaz Alam
(74) *Attorney, Agent, or Firm* — The Farrell Law Firm, P.C.

(57) ABSTRACT

An apparatus and method for power allocation in a mobile communication system are provided. A transmitting method includes allocating a certain fraction of total power to a common control channel; allocating available power corresponding to the remaining fraction of the total power to remaining control channels except for the common control channel among control channels transmitted in a current time slot by considering the remaining control channels; calculating a gain value of each control channel according to power allocated to each control channel; and regulating a gain of each control channel, which is to be transmitted to one or more Access Terminals (ATs), according to the calculated gain value. Therefore, reception throughput of each control channel can be improved.

26 Claims, 8 Drawing Sheets

FIG.3
(PRIOR ART)

APPARATUS AND METHOD FOR POWER ALLOCATION IN MOBILE COMMUNICATION SYSTEM

PRIORITY

This application claims priority under 35 U.S.C. §119(a) to a Korean patent application filed in the Korean Intellectual Property Office on Feb. 12, 2007 and assigned Serial No. 2007-14254, the disclosure of which is incorporated herein by reference.

BACKGROUND OF THE INVENTION

1. Field of the Invention

The present invention relates to an apparatus and method for power allocation in a mobile communication system. More particularly, the present invention relates to an apparatus and method in which power is effectively allocated to a Forward Link (FL) control channel in a mobile communication system.

2. Description of the Related Art

In general, in order for mobile communication systems to provide power control, handoff; transmission of a Signal to Interference and Noise Ratio (SINR), and transmission of Automatic Repeat reQuest (ARQ) information, a control channel is used in a Forward Link (FL) and a Reverse Link (RL).

FIG. 1 illustrates a signal flow between an Access Terminal (AT) operating in a soft-handoff mode and a Base Transceiver Station (BTS).

Referring to FIG. 1, an AT receives FL packets and FL control channels from two BTSs, and transmits RL packets and RL control channels to the BTSs. A Base Station Controller (BSC) receives from the two BTSs the signals provided from the AT, combines these signals, and transmits FL data packets and FL control signals to the two BTSs.

In general, when a plurality of ATs exist in a service area of a BTS, the BTS can use Time Division Multiplexing (TDM) or Code Division Multiplexing (CDM) in order to transmit a plurality of control channels corresponding to the respective ATs. In the following description, it is assumed that the control channels are transmitted by performing CDM.

FIG. 2 illustrates an FL slot format in a Code Division Multiple Access (CDMA) mobile communication system, in particular, in a CDMA 1×EVolution-Data Only (1×EV-DO) system. Referring to FIG. 2, one slot is divided into two half slots, each of which transmit data, a Media Access Control (MAC) channel, and a pilot channel. An FL control channel is transmitted through the MAC channel.

Figure 3:
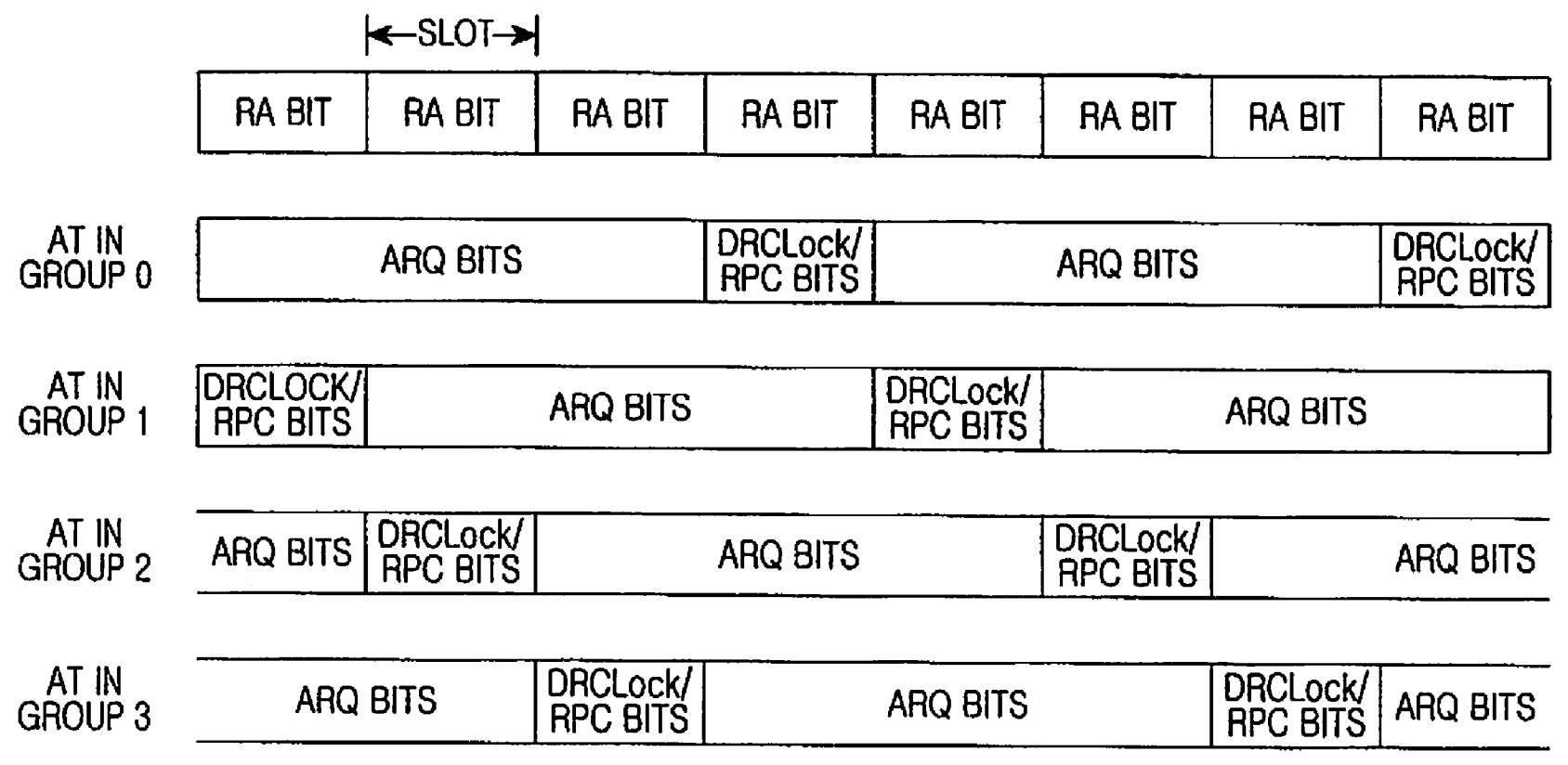

FIG. 3 illustrates a control channel format in a CDMA mobile communication system. That is, when a control channel is transmitted to four ATs through the MAC channel of FIG. 2, a signal transmitted in the slot unit has the format shown in FIG. 3.

Referring to FIG. 3, an FL control channel includes a Reverse Activity (RA) channel, a Data Rate Control Lock (DRCLock) channel, a Reverse Power Control (RPC) channel, and an ARQ channel. The RA channel is commonly transmitted to all ATs. The DRCLock channel, the RPC channel, and the ARQ channel are independently assigned to each AT. Each FL control channel is distinguished using an orthogonal code. That is, orthogonality is mutually maintained since the control channels transmitted in the same slot are spread by use of different codes (e.g., Walsh code).

The DRCLock channel and the RPC channel are concurrently transmitted in one slot. The ARQ channel is time-division multiplexed with the DRCLock/RPC channel and is transmitted for three slots. Transmission time points of the DRCLock/RPC channel and the ARQ channel are determined by a frame offset of an AT, as shown by Equation (1) below.

$$\text{If } (T-\text{FrameOffset}_k) \bmod 4 = 3, \text{ transmit } DRCLock/ \\ RPC \text{ channel Else transmit } ARQ \text{ channel} \quad (1)$$

Here, T denotes a time in the slot unit, FrameOffset$_k$ denotes a frame offset of a $k^{th}$ AT, and "x mod y" denotes a modular operation for obtaining a remainder of division of x by y. In Equation (1) above, since the transmission time point of the DRCLock/RPC channel for the $k^{th}$ AT is determined by a value of (FrameOffset$_k$ mod 4), ATs can be classified into four groups as shown in FIG. 3 according to their frame offsets.

By considering that each AT has a different transmission time point, a BTS verifies a control channel to be transmitted to each AT for each slot, and divides the total transmission power of a MAC channel to ATs.

A brief description of a conventional algorithm for MAC channel power allocation is now provided.

According to the conventional algorithm for MAC channel power allocation, total MAC channel power is divided in advance for an RA channel, a DRCLock channel, an RPC channel, and an ARQ channel, and then the divided power is used to allocate power to a corresponding control channel of each AT. For example, assume that the total MAC channel power is allocated so that 10% is used by the RA channel, 30% is used by the DRCLock channel, 30% is used by the RPC channel, and 30% is used by the ARQ channel. Then, 60% of the total power is allocated to a group of ATs for transmitting the DRCLock/RPC channel, and 30% of the total power is allocated to a group of ATs for transmitting the ARQ channel.

As such, when power allocated to each channel is divided in advance, if the total MAC channel power is less than a sum of the power required by an AT, some channels may experience performance degradation. For example, if a frame offset of the AT mostly appears in one of the four groups of FIG. 3, and thus the number of DRCLock/RPC channels is greater than a fraction of power allocated to the DRCLock/RPC channel, then reception throughput of the DRCLock/RPC channel deteriorates. Likewise, if the number of ARQ channels is greater than a fraction of power allocated to the ARQ channel, reception throughput of the ARQ channel deteriorates.

Accordingly, when using conventional algorithms in which the total MAC channel power is divided in advance for the DRCLock channel, the RPC channel, and the ARQ channel before power allocation is performed, reception throughput may deteriorate in some channels if power is inaccurately divided for each channel. Therefore, there is a need for a method in which total power allocated to an FL MAC channel can be effectively allocated to each control channel.

SUMMARY OF THE INVENTION

An aspect of the present invention is to address at least the above-mentioned problems and/or disadvantages and to provide at least the advantages described below. Accordingly, an aspect of the present invention is to provide an apparatus and method for effectively allocating power to a control channel in a mobile communication system.

Another aspect of the present invention is to provide an apparatus and method for improving reception throughput of a control channel in a mobile communication system.

Another aspect of the present invention is to provide an apparatus and method for effectively using total power allocated to a Media Access Control (MAC) channel in a mobile communication system.

According to an aspect of the present invention, a transmitting apparatus in a mobile communication system is provided. The apparatus includes a power allocator for allocating a certain fraction of total power to a common control channel, for allocating available power corresponding to the remaining fraction of the total power to remaining control channels except for the common control channel among control channels transmitted in a current time slot by considering the remaining control channels, and for regulating a gain of each control channel according to power allocated to each control channel; and a control channel generator for generating a plurality of control channels to be transmitted to one or more Access Terminals (ATs) and for regulating the gain of each control channel under the control of the power allocator.

According to another aspect of the present invention, a transmitting method in a mobile communication system is provided. The method includes allocating a certain fraction of total power to a common control channel; allocating available power corresponding to the remaining fraction of the total power to remaining control channels except for the common control channel among control channels transmitted in a current time slot by considering the remaining control channels; calculating a gain value of each control channel according to power allocated to each control channel; and regulating a gain of each control channel, which is to be transmitted to one or more ATs, according to the calculated gain value.

BRIEF DESCRIPTION OF THE DRAWINGS

The above and other aspects, features and advantages of certain exemplary embodiments of the present invention will become more apparent from the following detailed description when taken in conjunction with the accompanying drawings in which:

FIG. 3 illustrates a control channel format in a CDMA mobile communication system;

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail. Also, the terms used herein are defined according to the functions of the present invention. Thus, the terms may vary depending on user's or operator's intension and usage. That is the terms used herein must be understood based on the descriptions made herein.

Hereinafter, a technique for effectively allocating power to a control channel in a mobile communication system will be described. In the following description, power is allocated to a Forward Link (FL) control channel in a Code Division Multiple Access (CDMA) mobile communication system as an example. However, the present invention also applies to other mobile communication systems employing different multiple access schemes. Further, the present invention also applies to a Reverse Link (RL) environment.

Figure 4:
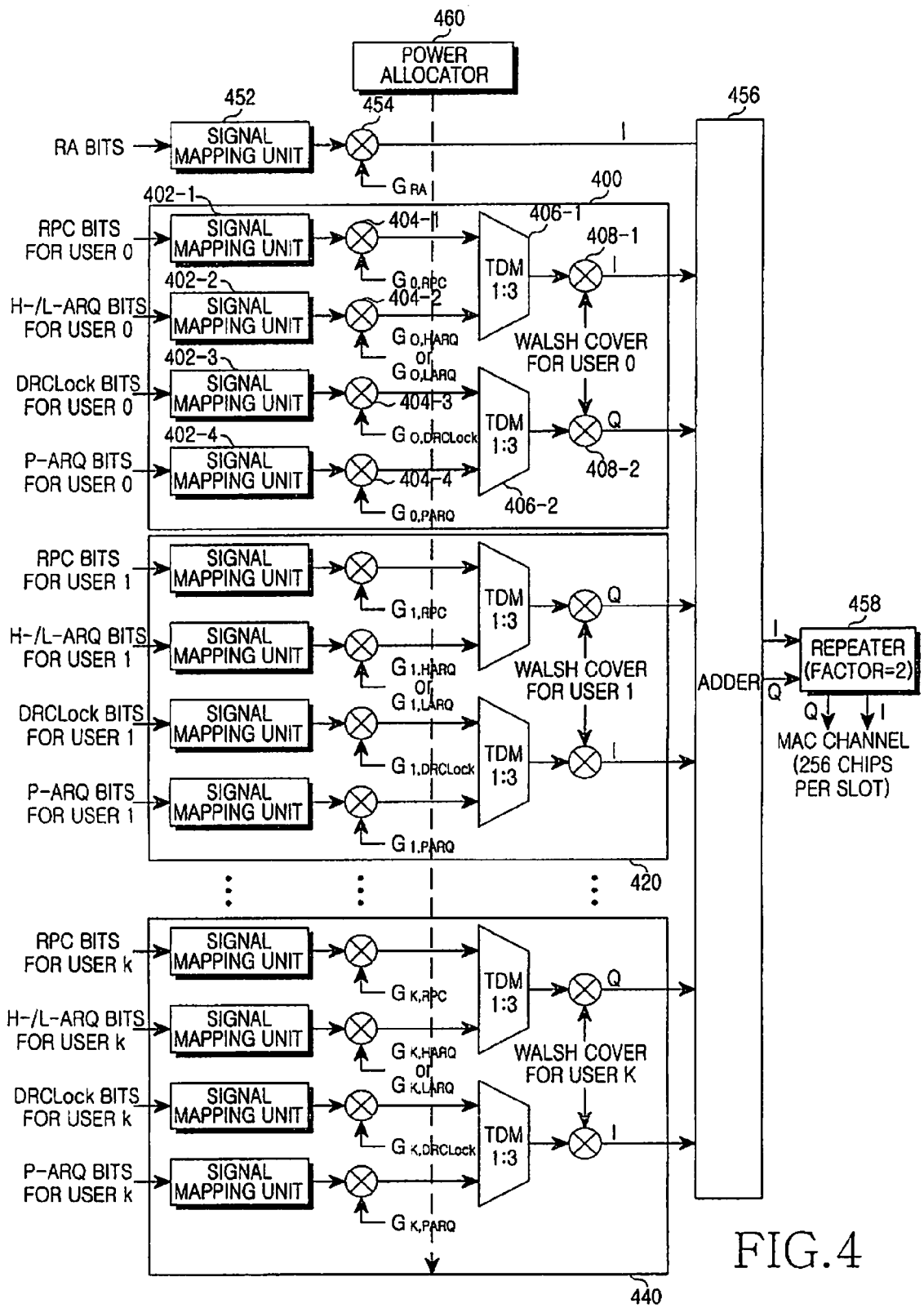
FIG. 4 is a block diagram illustrating a BTS in a mobile communication system according to the present invention.

FIG. 4 is a block diagram illustrating a Base Transceiver Station (BTS) in a mobile communication system according to the present invention.

The diagram of FIG. 4 focuses on a Media Access Control (MAC) channel transmitter related to the present invention. The BTS of FIG. 4 includes a plurality of channel generators 400, 420, and 440, a Reverse Activity (RA) channel generator having a signal mapping unit 452 and a multiplier unit 454, an adder 456, a repeater 458, and a power allocator 460. Each channel generator includes a plurality of signal mapping units, a plurality of multiplier units, and a plurality of Time Division Multiplexing (TDM) units. Since the channel generators 400, 420, and 440 have the same structure, the following description will focus on the channel generator 400 for a user 0.

The signal mapping unit 452 maps an input RA bit to a corresponding signal. For example, if the input bit is '0', the input bit is mapped to '+1', and if the input bit is '1', the input bit is mapped to '−1'. The multiplier unit 454 multiplies the signal output from the signal mapping unit 452 and a channel gain $G_{RA}$ obtained from the power allocator 460. Thus, the multiplier unit 454 regulates a gain of an RA channel and outputs an In-phase (I) signal.

Now, the channel generator 400 for the user 0 will be described.

The signal mapping unit 402-1 maps an input Reverse Power Control (RPC) bit to a corresponding signal. The multiplier unit 404-1 multiples the signal output from the signal mapping unit 402-1 by a channel gain $G_{0,RPC}$ obtained from the power allocator 460. Thus, the multiplier unit 404-1 regulates a gain of an RPC channel to be transmitted to the user 0.

The signal mapping unit 402-2 maps an input Hybrid ARQ/Last ARQ (H-/L-ARQ) bit to a corresponding signal. For example, signal mapping is performed according to a method of transmitting Automatic Repeat reQuest (ARQ) information, as shown by Equation (2) below.

$$\text{H-ARQ BPSK: } 0 \to +1, 1 \to -1$$

$$\text{H-ARQ OOK: } 0 \to +1, 1 \to 0$$

$$\text{L-ARQ: } 0 \to 0, 1 \to -1 \qquad (2)$$

The multiplier unit 404-2 multiples the signal output from the signal mapping unit 402-2 by a channel gain $G_{0,HARQ}$ (or $G_{0,LARQ}$) obtained from the power allocator 460. Thus, the multiplier unit 404-2 regulates a gain of a H-/L-ARQ channel to be transmitted to the user 0.

The signal mapping unit 402-3 maps an input DRCLock bit to a corresponding signal. The multiplier unit 404-3 multiples the signal output from the signal mapping unit 402-3 by a channel gain $G_{0,DRCLock}$ obtained from the power allocator 460. Thus, the multiplier unit 404-3 regulates a gain of a DRCLock channel to be transmitted to the user 0.

The signal mapping unit 402-4 maps an input Packet ARQ (P-ARQ) bit to a corresponding signal. The multiplier unit 404-4 multiplies the signal output from the signal mapping unit 402-4 by a channel gain $G_{0,PARQ}$ obtained from the power allocator 460. Thus, the multiplier unit 404-4 regulates a gain of a P-ARQ channel to be transmitted to the user 0.

If ((T-FrameOffset)mod 4)=3, the first TDM unit 406-1 selects the RPC channel, and otherwise selects the H-/L-ARQ channel. That is, the first TDM unit 406-1 performs TDM so that the RPC channel and the H-/L-ARQ channel are divided in a ratio of 1:3. Likewise, if ((T-FrameOffset$_0$) mod 4)=3, the second TDM 406-2 selects the DRCLock channel, and otherwise selects the P-ARQ channel. That is, the second TDM 406-2 performs TDM so that the DRCLock channel and the P-ARQ channel are divided in a ratio of 1:3.

The multiplier unit 408-1 multiplies the signal output from the first TDM unit 406-1 by a Walsh code obtained from a Walsh code generator (not shown), and thus outputs an In-phase (I) signal. The multiplier unit 408-2 multiplies a signal output from the second TDM 406-2 by the Walsh code obtained from the Walsh code generator, and thus outputs a Quadrature-phase (Q) signal.

Regarding a user 1, transmission is basically the same as in the case of user 0. However, a gain of each control channel and the Walsh code to be multiplied by the signals of an I channel and a Q channel are modified. Further, in the case of user 0, the RPC channel and the H-/L-ARQ channel are input to the I channel, and the DRCLock channel and the P-ARQ channel are output to the Q channel. On the other hand, in the case of the user 1, the RPC channel and the H-/L-ARQ channel are input to the Q channel, and the DRCLock channel and the P-ARQ channel are input to the I channel. That is, for even numbered users (i.e., user 0, user 2, user 4, etc.), the RPC channel and the H-/L-ARQ channel are input to the I channel, and the DRCLock channel and the P-ARQ channel are input to the Q channel. In addition, for odd numbered users (i.e., user 1, user 3, user 5, etc.), the RPC channel and the H-/L-ARQ channel are input to the Q channel, and the DRCLock channel and the P-ARQ channel are input to the I channel.

For each slot, the power allocator 460 calculates transmission power of each control channel. Then, as shown in Equation (3) below, the power allocator 460 calculates a channel gain using the calculated transmission power, and provides the calculation result to a corresponding gain regulator (i.e., multiplier unit). An operation of the power allocator 460 of the present invention is described in greater detail with reference to FIG. 5 to FIG. 8.

$$G_{k,DRCLock}=\sqrt{a_{k,DRCLock}}, G_{k,RPC}=\sqrt{a_{k,RPC}}$$

$$G_{k,HARQ}=\sqrt{a_{k,HARQ}}, G_{k,LARQ}=\sqrt{a_{k,LARQ}}$$

$$G_{k,PARQ}=\sqrt{a_{k,PARQ}} \quad (3)$$

Herein, $a_{k,DRCLock}$, $a_{k,RPC}$, $a_{k,HARQ}$, $a_{k,LARQ}$, and $a_{k,PARQ}$ denote transmission power allocated to the DRCLock channel, the RPC channel, the H-ARQ channel, the L-ARQ channel, and the P-ARQ channel, respectively, each of which are to be transmitted to a $k^{th}$ user.

Figure 1:
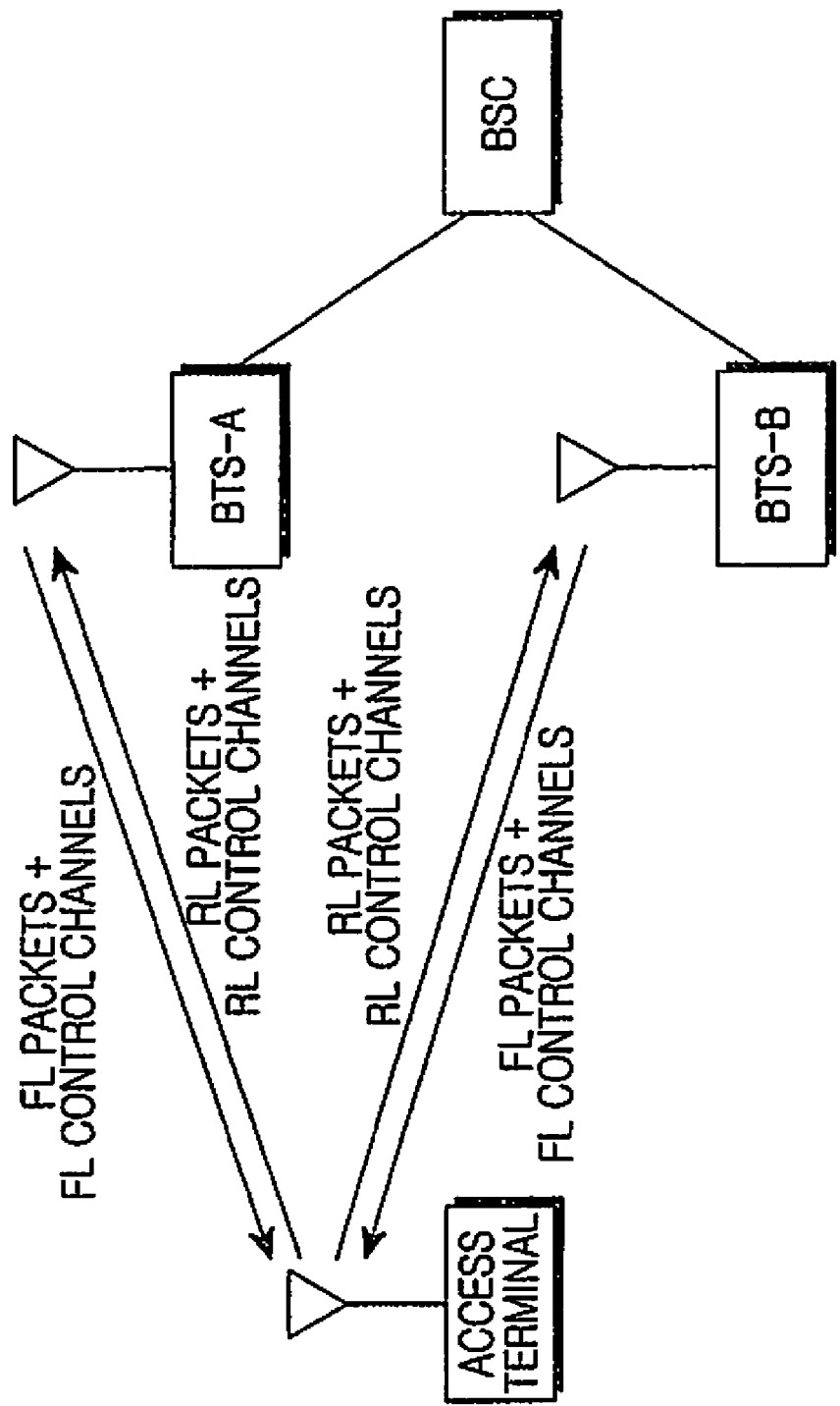
FIG. 1 illustrates a signal flow between an Access Terminal (AT) operating in a soft-handoff mode and a Base Transceiver Station (BTS)
Figure 2:
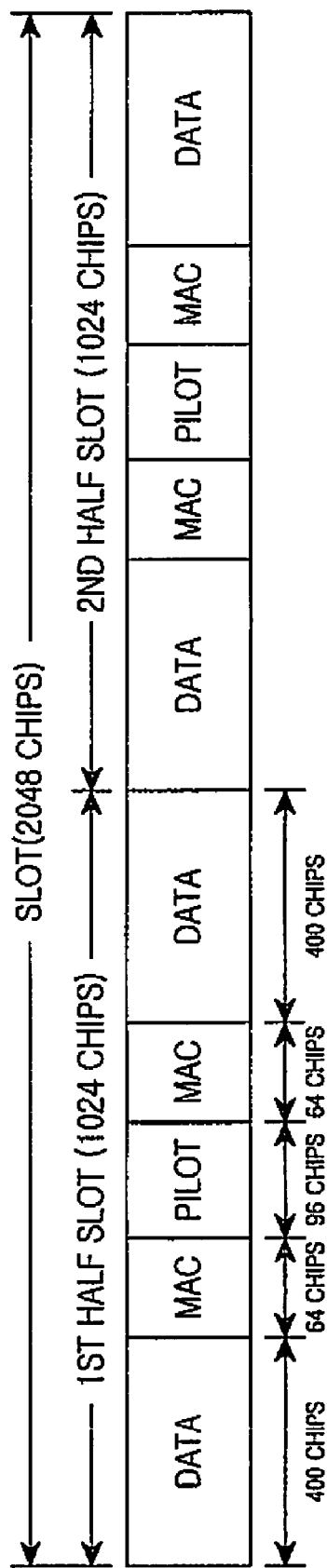
FIG. 2 illustrates a Forward Link (FL) slot format in a Code Division Multiple Access (CDMA) mobile communication system.

The adder 456 divides an input RA channel and a control channel to be transmitted to each user into the I channel and the Q channel, and respectively adds I channel signals and Q channel signals in a chip unit. The repeater 458 repeats the I channel signal and Q channel signal obtained from the adder 456 and thus generates a MAC channel signal in which the same signal pattern is repeated twice. The MAC channel signal generated per slot amounts to 256 chips. In order to transmit the MAC channel signal, as shown in FIG. 2, the MAC channel signal is divided into four separate periods of 64 chips, and thus four transmissions are made for each slot.

Figure 5:
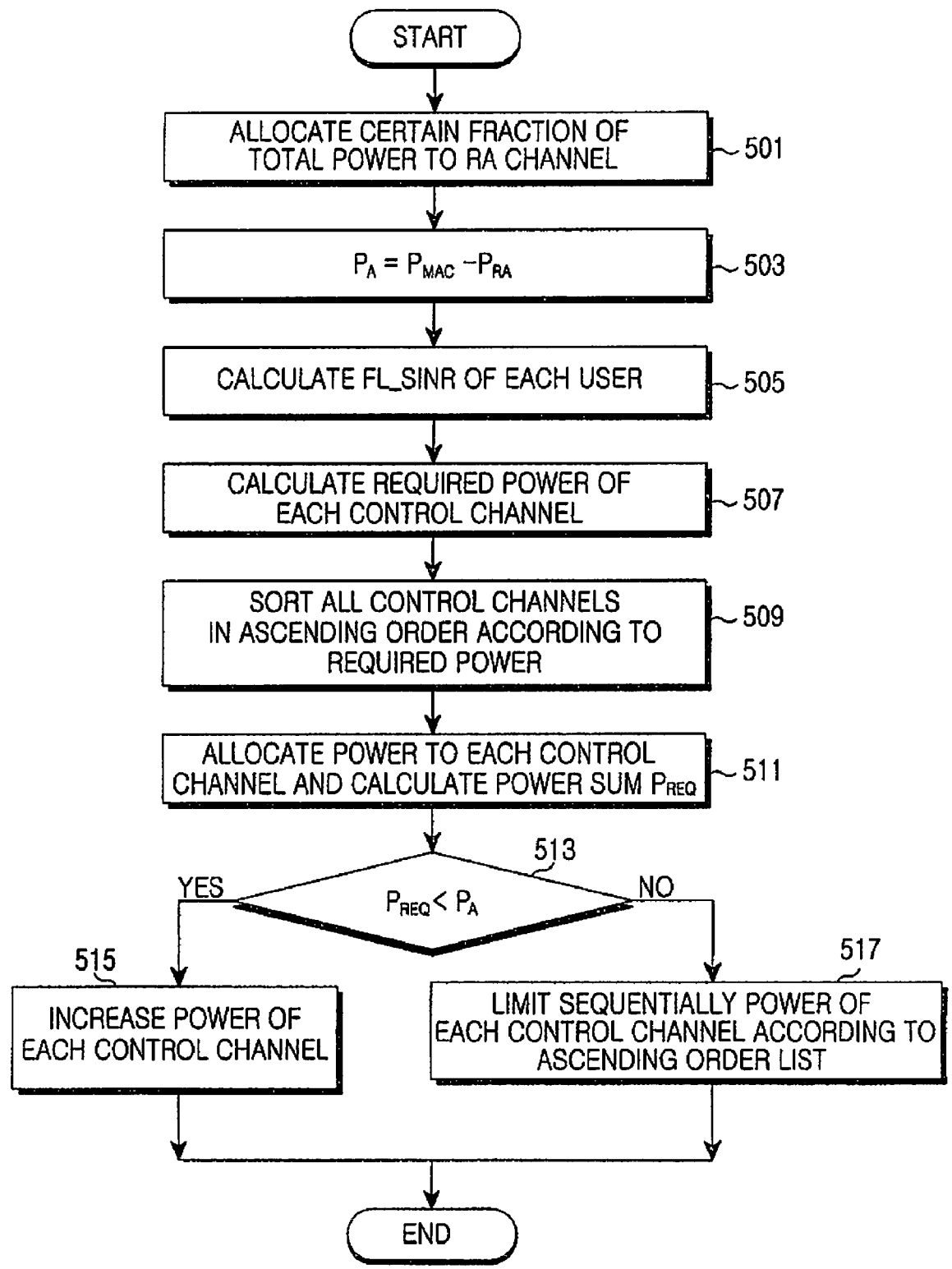
FIG. 5 is a flowchart illustrating a detailed operation of a power allocator according to the present invention.

FIG. 5 is a flowchart illustrating a detailed operation of the power allocator 460 according to the present invention.

Referring to FIG. 5, a fraction of total power of an MAC channel is allocated to an RA channel in step 501. In step 503, power $P_{RA}$ allocated to the RA channel is subtracted from total power $P_{MAC}$ of the MAC channel to obtain available power $P_A$, as shown by Equation (4) below.

$$P_A=P_{MAC}-P_{RA} \quad (4)$$

As such, the available power $P_A$ which can be allocated to a DRCLock channel, an RPC channel, and an ARQ channel is calculated. Then, in step 505, a Forward Link SINR (FL_SINR) of each AT is calculated considering a DRC value received from each AT and a handoff state. In step 507, required power of each control channel is calculated considering a target SINR, which ensures reliable reception throughput of a control channel transmitted in a current slot, and also considering the FL_SINR of each AT. An operation of step 507 is described below in greater detail with reference to FIG. 6.

As such, the required power is calculated for each control channel transmitted in the current slot. Then, in step 509, all control channels (except for the RA channel) are sorted in ascending order according to the required power. That is, an ascending order list is created. In step 511, power (i.e., required power) is allocated to each control channel according to the sorted order, and the power allocated to all control channels are summed to obtain power sum $P_{REQ}$.

In step 513, it is determined if the power sum $P_{REQ}$ is less than the available power $P_A$. If the power sum $P_{REQ}$ is less than the available power $P_A$, proceeding to step 515, the allocated power is increased by considering the required power of each control channel. In other words, if power remains since the power allocated to all control channels is less than the available power $P_A$ that can be allocated, then the power of each control channel is boosted by considering the required power. An operation of step 515 is described in greater detail with reference to FIG. 7.

To the contrary, if the power sum $P_{REQ}$ is greater than or equal to the available power $P_A$, proceeding to step 517, the power of each control channel is sequentially decreased according to the ascending order list. In other words, if power is short since the power allocated to all control channels is greater than the available power $P_A$ that can be allocated, then the power of each control channel is reduced by limiting the power allocated to each control channel. This is repeated until a sum of power allocated to all control channels finally becomes equal to the available power $P_A$. An operation of step 517 is described below in greater detail with reference of FIG. 8.

Figure 6:
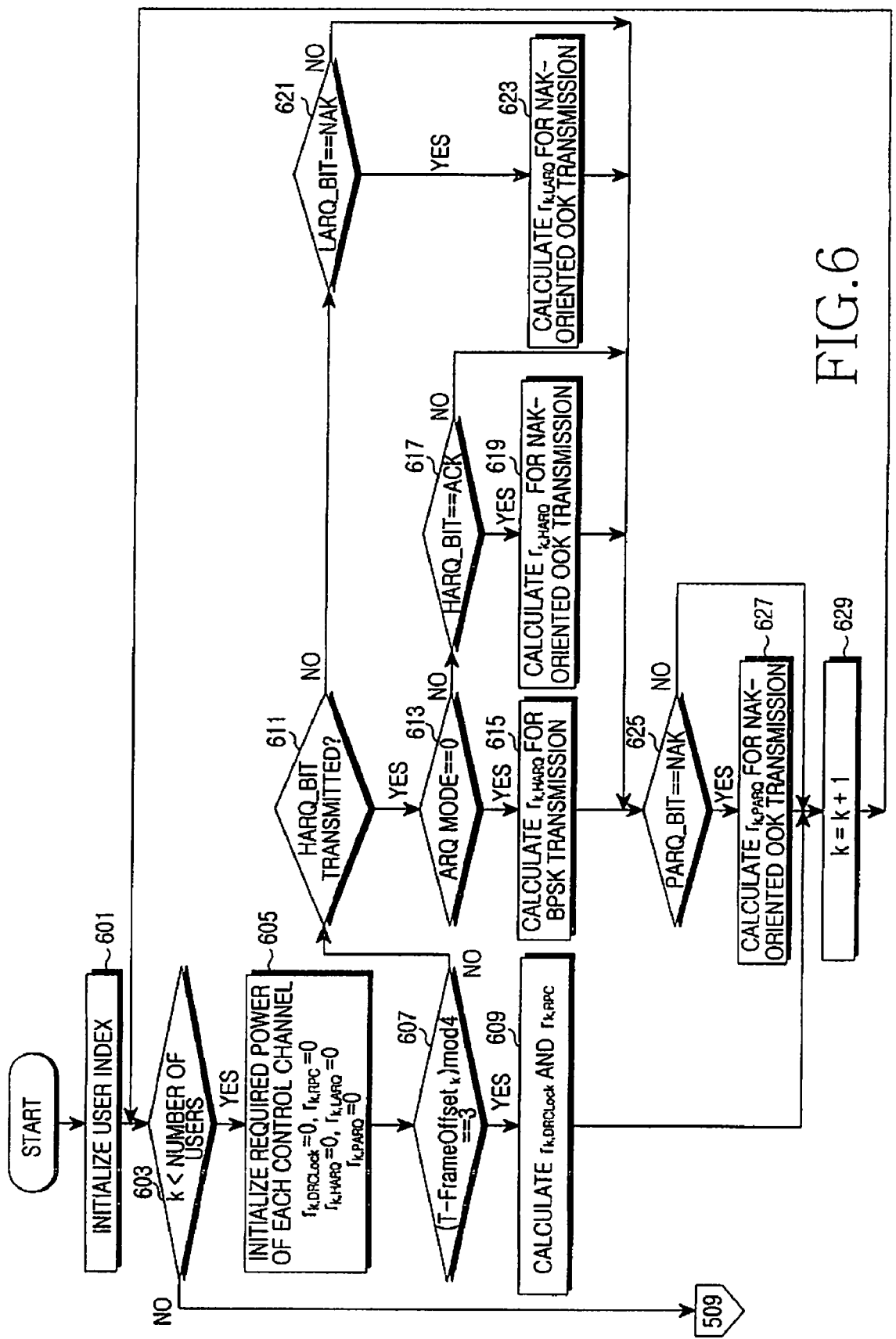
FIG. 6 is a flowchart illustrating in detail the operation of step 507 of FIG. 5.

FIG. 6 is a flowchart illustrating in detail the operation of step 507 of FIG. 5, which is performed by the power allocator 460.

Referring to FIG. 6, a user index k is initialized to '0' in step 601. In step 603, it is determined if the user index k is less than the number of users. If the user index k is greater than or equal to the number of users, the procedure proceeds to step 509 of FIG. 5.

To the contrary, if the user index k is less than the number of users, proceeding to step 605, required power of each control channel is initialized as shown by Equation (5) below.

$$r_{k,DRCLock}=0, r_{k,RPC}=0, r_{k,HARQ}=0, r_{k,LARQ}=0,$$
$$r_{k,PARQ}=0 \quad (5)$$

Herein, $r_{k,DRCLock}$ denotes required power of a DRCLock channel of a $k^{th}$ user, $r_{k,RPC}$ denotes required power of an RPC channel of the $k^{th}$ user, $r_{k,HARQ}$ denotes required power of a H-ARQ channel of the $k^{th}$ user, $r_{k,LARQ}$ denotes required power of an L-ARQ channel of the $k^{th}$ user, and $r_{k,PARQ}$ denotes required power of a P-ARQ channel of the $k^{th}$ user. The H-ARQ channel is used to feed back, to an AT, information which indicates a success or failure of receiving sub-packets when first, second, and third sub-packets are received on a Reverse Link (RL). The L-ARQ channel is used to feed back information which indicates a success or failure of receiving sub-packets when a fourth sub-packet is received on the RL. The P-ARQ channel is used to finally feed back information which indicates a success or failure of receiving packets after the four sub-packets are all received on the RL.

In step 607, a current slot number (or a slot time) and a frame offset of the $k^{th}$ user are substituted to Equation (1) above to determine a control channel transmitted in the current slot. That is, it is determined whether the DRCLock/RPC channel or the ARQ channel is transmitted to the $k^{th}$ user in the current slot.

If the DRCLock/RPC channel is transmitted, in step 609, the required power of the DRCLock/RPC channel is updated by using an FL_SINR of the $k^{th}$ user, a target SINR of the DRCLock channel, and a target SINR of the RPC channel. Then, the procedure proceeds to step 629. For example, the required power of the DRCLock channel (i.e., $r_{k,DRCLock}$) is calculated as shown by Equation (6) below, and the required power of the RPC channel (i.e., $r_{k,RPC}$) is calculated as shown by Equation (7) below.

$$r_{k,DRCLock} = \max\left(\min-DRCLock-\text{power}, \frac{\text{target}-DRCLock-SINR}{FL-SINR_k}\right) \quad (6)$$

$$r_{k,RPC} = \max\left(\min-RPC-\text{power}, \frac{\text{target}-RPC-SINR}{FL-SINR_k}\right) \quad (7)$$

Herein, FL-SINR$_k$ denotes an FL_SINR of the $k^{th}$ user, min-DRCLock-power denotes minimum allocated-power of the DRCLock channel, and min-RPC-power denotes minimum allocated-power of the RPC channel. Further, target-DRCLock-SINR denotes a target SINR of the DRCLock channel, and target-RPC-SINR denotes a target SINR of the RPC channel.

Meanwhile, if the ARQ channel is determined in step 607, proceeding to step 611, it is examined if a H-ARQ bit is transmitted to the $k^{th}$ user. If the H-ARQ bit is transmitted, it is examined if an ARQ mode is '0' in step 613. If the ARQ mode is '0', the procedure proceeds to step 615, and, if the ARQ mode is '1', the procedure proceeds to step 617.

In step 615, the required power of the H-ARQ channel is updated by using the FL-SINR of the $k^{th}$ user and also by using a target SINR used when the H-ARQ bit is transmitted using Binary Phase Shift Keying (BPSK). Then, the procedure proceeds to step 625. For example, the required power of the H-ARQ channel can be calculated as shown by Equation (8) below.

$$r_{k,HARQ} = \quad (8)$$
$$\max\left(\min-HARQ-BPSK-\text{power}, \frac{\text{target}-HARQ-BPSK-SINR}{FL-SINR_k}\right)$$

Herein, min-HARQ-BPSK-power denotes minimum allocated-power when the H-ARQ bit is transmitted using BPSK, and target-HARQ-BPSK-SINR denotes a target SINR used when the H-ARQ bit is transmitted using BPSK.

In step 617, it is determined whether the H-ARQ bit is 'ACK'. If the H-ARQ bit is 'ACK', the procedure proceeds to step 619, and if the H-ARQ bit is not 'ACK', the procedure proceeds to step 625. In step 619, the required power of the H-ARQ channel is updated by using the FL_SINR of the $k^{th}$ user and the target SINR used when the H-ARQ bit is transmitted using On-Off Keying (OOK). Then, the procedure proceeds to step 625. For example, when ACK is transmitted, the required power of the H-ARQ channel can be calculated as shown by Equation (9) below.

$$r_{k,HARQ} = \quad (9)$$
$$\max\left(\min-HARQ-OOK-\text{power}, \frac{\text{target}-HARQ-OOK-SINR}{FL-SINR_k}\right)$$

Herein, min-HARQ-OOK-power denotes minimum allocated-power when the H-ARQ bit is transmitted using OOK, and target-HARQ-OOK-SINR denotes a target SINR when the H-ARQ bit is transmitted using OOK.

If it is determined in step 611 that the H-ARQ bit is not transmitted, proceeding to step 621, an L-ARQ bit is examined to determine if the L-ARQ bit is 'NAK(or NACK)'. If the L-ARQ bit is 'NAK', the procedure proceeds to step 623, and otherwise, the procedure proceeds to step 625. In step 623, the required power of the L-ARQ channel is updated by using the FL_SINR of the $k^{th}$ user and a target SINR used when the L-ARQ bit is transmitted. Then, the procedure proceeds to step 625. For example, the required power of the L-ARQ channel can be calculated according to Equation (10) below.

$$r_{k,LARQ} = \max\left(\min-LARQ-\text{power}, \frac{\text{target}-LARQ-SINR}{FL-SINR_k}\right) \quad (10)$$

Herein, min-LARQ-power denotes minimum allocated-power when the L-ARQ bit is transmitted, and target-LARQ-SINR denotes a target SINR when the L-ARQ bit is transmitted.

A P-ARQ bit is examined in step 625. If the P-ARQ bit is 'NAK', the procedure proceeds to step 627, and otherwise, the procedure proceeds to step 629. In step 627, the required power of the P-ARQ channel is updated using the FL_SINR of the $k^{th}$ user and a target SINR used when the P-ARQ bit is transmitted. Then, the procedure proceeds to step 629. For example, the required power of the P-ARQ channel can be calculated as shown by Equation (11) below.

$$r_{k,PARQ} = \max\left(\min-PARQ-\text{power}, \frac{\text{target}-PARQ-SINR}{FL-SINR_k}\right) \quad (11)$$

Herein, min-PARQ-power denotes minimum allocated-power when the P-ARQ bit is transmitted, and target-PARQ-SINR denotes a target SINR when the P-ARQ bit is transmitted.

As such, the required power for a control channel to be transmitted to the $k^{th}$ user is calculated. Then, in step 629, the user index k is incremented by '1', and the procedure returns to step 603.

In FIG. 6, the minimum allocated-power and the target SINR, each of which is required by each control channel, are determined according to throughput of each channel and the number of simultaneously accessible ATs. These values are assumed to be predetermined.

Figure 7:
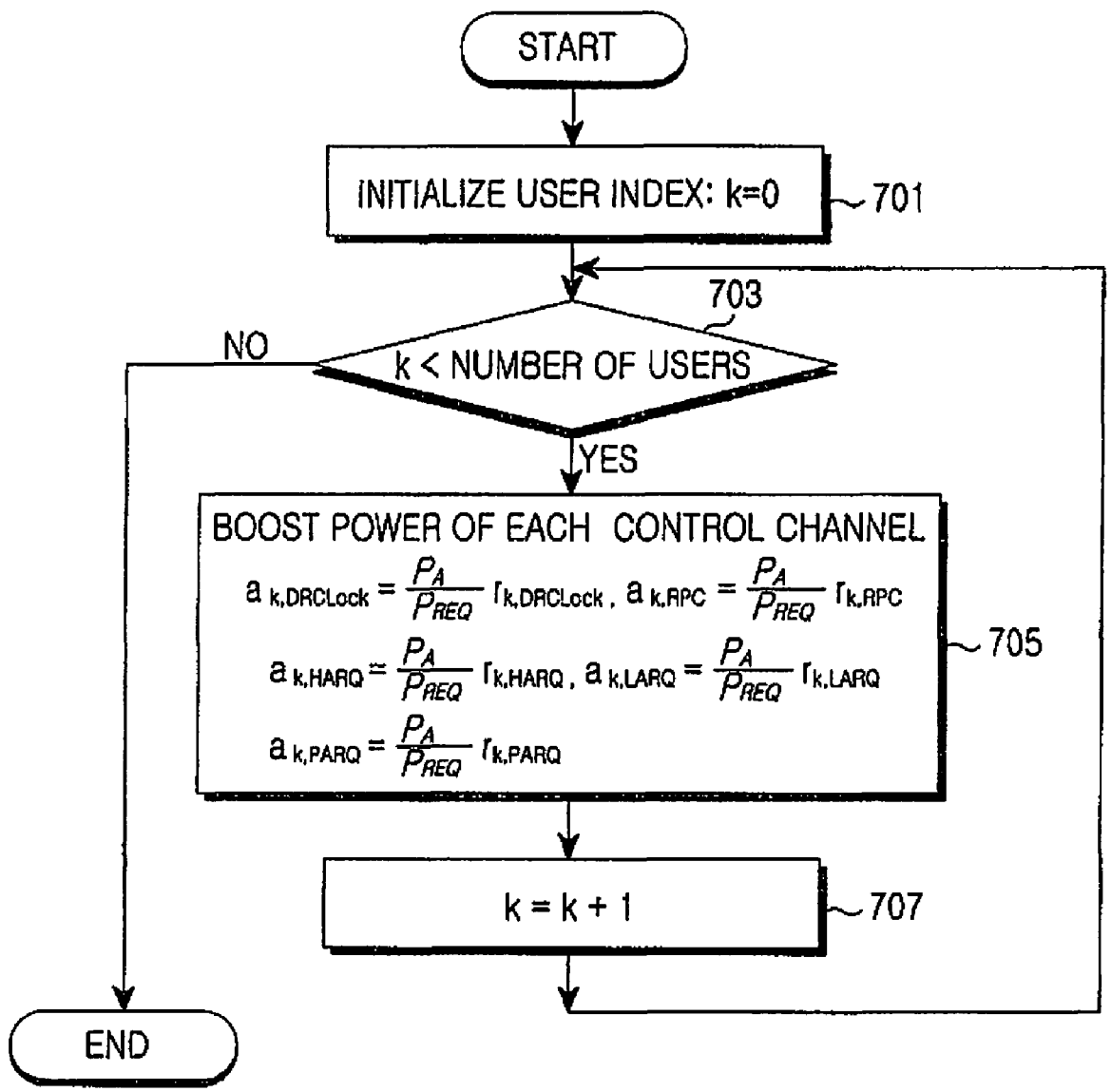
FIG. 7 is a flowchart illustrating in detail the operation of step 515 of FIG. 5.

FIG. 7 is a flowchart illustrating in detail the operation of step 515 of FIG. 5, which is performed by the power allocator 460. Referring to FIG. 7, a user index k is initialized to '0' in step 701. In step 703, it is determined if the user index k is less than the number of users. If the user index k is greater than or equal to the number of users, the procedure of FIG. 5 ends.

To the contrary, if the user index k is less than the number of users, proceeding to step 705, power allocated to a control channel to be transmitted to the $k^{th}$ user is increased using a ratio of the power sum $P_{REQ}$ and the available power $P_A$, as shown by Equation (12) below.

$$a_{k,DRCLock} = \frac{P_A}{P_{REQ}} r_{k,DRCLock}$$

$$a_{k,RPC} = \frac{P_A}{P_{REQ}} r_{k,RPC}$$

$$a_{k,HARQ} = \frac{P_A}{P_{REQ}} r_{k,HARQ}$$

$$a_{k,LARQ} = \frac{P_A}{P_{REQ}} r_{k,LARQ}$$

$$a_{k,PARQ} = \frac{P_A}{P_{REQ}} r_{k,PARQ} \qquad (12)$$

Herein, $a_{k,DRCLock}$, $a_{k,RPC}$, $a_{k,HARQ}$, $a_{k,LARQ}$, and $a_{k,PARQ}$ denote transmission power finally allocated to the DRCLock channel, the RPC channel, the H-ARQ channel, the L-ARQ channel, and the P-ARQ channel, respectively, each of which are to be transmitted to a $k^{th}$ user.

As such, power of the control channel to be channel transmitted to the $k^{th}$ user is controlled. Then, in step 707, the user index k increases by '1', and the procedure returns to step 703.

Figure 8:
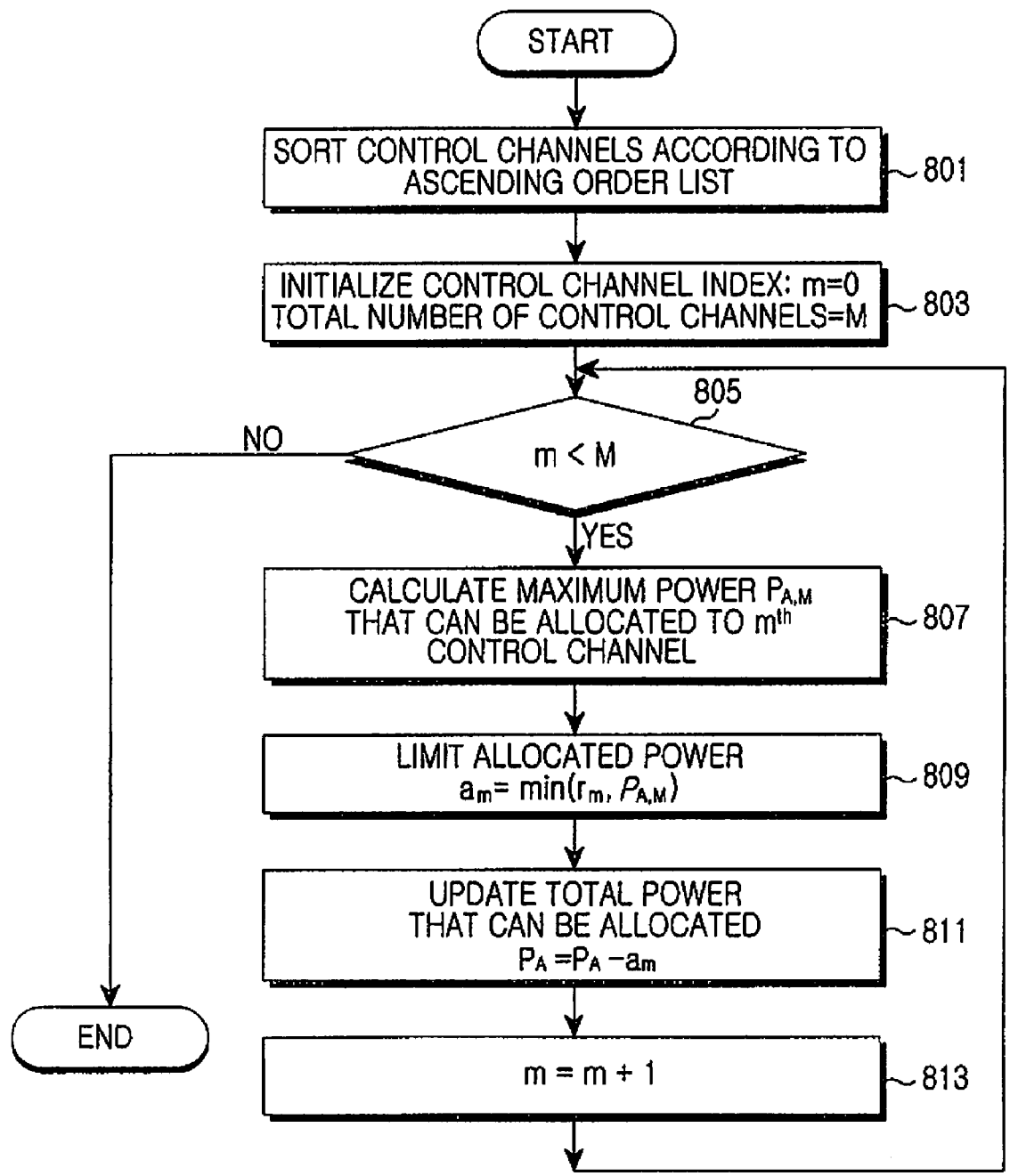
FIG. 8 is a flowchart illustrating in detail the operation of step 517 of FIG. 5.

FIG. 8 is a flowchart illustrating in detail the operation of step 517 of FIG. 5, which is performed by the power allocator 460. Referring to FIG. 8, all control channels are sorted in ascending order according to required power in step 801. In step 803, a control channel index m is initialized to '0'. Herein, the total number of the control channels is assumed to be M. For example, assume that the total number of users is 4, two control channels are transmitted to a first user, two control channels are transmitted to a second user, two control channels are transmitted to a third user, and one control channel is transmitted to a fourth user. Then, M is equal to '7'.

In step 805, it is determined whether the control channel index m is less than the value M. If the control channel index m is greater than or equal to the value M, the procedure of FIG. 5 ends.

Otherwise, if the control channel index m is less than the value M, proceeding to step 807, maximum power $P_{A,m}$ that can be allocated to an $m^{th}$ control channel is calculated by considering available power $P_A$. For example, the maximum power $P_{A,m}$ for an $m^{th}$ control channel can be calculated as shown by Equation (13) below.

$$P_{A,m} = \frac{P_A}{M-m} \qquad (13)$$

In step 809, required power $r_m$ of the $m^{th}$ control channel is compared with the calculated maximum power $P_{A,m}$, and a smaller value between the compared values is determined as allocated power of the $m^{th}$ control channel. The required power $r_m$ is one of $r_{k,DRCLock}$, $r_{k,RPC}$, $r_{k,HARQ}$, $r_{k,LARQ}$, and $r_{k,PARQ}$ according to a type of control channel.

In step 811, the available power $P_A$ is updated by considering power allocated to the $m^{th}$ control channel, as shown by Equation (14) below.

$$P_A = P_A a_m \qquad (14)$$

As such, power for the $m^{th}$ control channel is controlled. Then, in step 813, the control channel index m increases by '1', and the procedure returns to step 805.

As such, through the operations described with reference to FIG. 5 to FIG. 8, transmission power is determined for each control channel transmitted in a suitable slot, and a gain of each control channel is regulated according to the determined transmission power.

According to the present invention, limited total power is effectively allocated to a plurality of control channels in a Base Transceiver Station (BTS) of a mobile communication system. Therefore, reception throughput of each control channel can be improved.

While the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. A transmitting apparatus in a mobile communication system, the apparatus comprising:
    a power allocator for allocating a fraction of total power to a common control channel, for dividing and allocating available power corresponding to a remaining fraction of the total power to remaining control channels except for the common control channel among control channels transmitted in a current time slot by considering the remaining control channels, and for calculating a gain of each control channel according to power allocated to each control channel; and
    a control channel generator for generating a plurality of control channels to be transmitted to one or more Access Terminals (ATs) and for regulating the gain of each control channel under the control of the power allocator.

2. The apparatus of claim 1, wherein, for each AT, the control channel generator generates at least one of a Data Rate Control Lock (DRCLock) channel, a Reverse Power Control (RPC) channel, and an Automatic Repeat reQuest (ARQ) channel.

3. The apparatus of claim 1, wherein the common control channel comprises a Reverse Activity (RA) channel, and wherein the remaining control channels comprise one or more DRCLock channels, one or more RPC channels, and one or more ARQ channels.

4. The apparatus of claim 3, wherein the ARQ channel comprises a Hybrid ARQ (H-ARQ) channel, a Last ARQ (L-ARQ) channel, and a Packet ARQ (P-ARQ) channel.

5. The apparatus of claim 1, wherein the power allocator calculates required power of each control channel, sorts the control channels in ascending order according to the required power, and allocates transmission power in the sorted order.

6. The apparatus of claim 5, wherein the required power is calculated by using a Forward Link (FL) Signal to Interference and Noise Ratio (SINR) and a target SINR of each control channel.

7. The apparatus of claim 5, wherein the power allocator compares the available power with a sum of power allocated to all control channels, and, if the available power is greater than the sum, increases transmission power of each control channel.

8. The apparatus of claim 7, wherein, if available power is greater than the sum of power, the power allocator increases the transmission power of each control channel using a ratio of the available power and the sum of power.

9. The apparatus of claim 5, wherein the power allocator compares available power with a sum of power allocated to all control channels, and, if the available power is less than the sum, decreases transmission power of each control channel.

10. The apparatus of claim 9, wherein the power allocator sorts all control channels in ascending order according to a magnitude of allocated transmission power, and decreases the transmission power of each control channel in the sorted order.

11. The apparatus of claim 9, wherein the power allocator calculates maximum power $P_{A,m}$ that can be allocated to an $m^{th}$ control channel using $$P_{A,m} = \frac{P_A}{M-m},$$

where m denotes a control channel index, $P_A$ denotes available power in the current time slot, and M denotes a total number of control channels, and wherein the power allocator decreases transmission power of the $m^{th}$ control channel to a smaller value between required power of the $m^{th}$ control channel and the maximum power.

12. The apparatus of claim 1, wherein the control channel generator comprises:
a signal mapping unit for mapping a transmission information bit to a signal;
a first multiplier unit for multiplying the signal output from the signal mapping unit by a gain value obtained from the power allocator, to perform gain regulation; and
a second multiplier unit for multiplying the signal output from the first multiplier unit by a Walsh code allocated to each AT, to generate a control channel signal.

13. The apparatus of claim 1, further comprising:
an adder for summing a plurality of channel signals, each of which have undergone the gain regulation, in a chip unit;
a repeater for repeating the summed signal to generate a Media Access Control (MAC) channel signal; and
a transmitter for transmitting the MAC channel signal in a time slot.

14. A transmitting method in a mobile communication system, the method comprising:
allocating a fraction of total power to a common control channel;
dividing and allocating available power corresponding to a remaining fraction of the total power to remaining control channels except for the common control channel among control channels transmitted in a current time slot by considering the remaining control channels;
calculating a gain value of each control channel according to power allocated to each control channel; and
regulating a gain of each control channel, which is to be transmitted to one or more Access Terminals (ATs), according to the calculated gain value.

15. The method of claim 14, wherein at least one of a Data Rate Control Lock (DRCLock) channel, a Reverse Power Control (RPC) channel, and an Automatic Repeat reQuest (ARQ) channel is transmitted for each AT.

16. The method of claim 14, wherein the common control channel comprises a Reverse Activity (RA) channel, and wherein the remaining control channels each comprise one or more DRCLock channels, one or more RPC channels, and one or more ARQ channels.

17. The method of claim 16, wherein the ARQ channel comprises a Hybrid ARQ (H-ARQ) channel, a Last ARQ (L-ARQ) channel, and a Packet ARQ (P-ARQ) channel.

18. The method of claim 14, wherein the allocating comprises:
calculating required power of each control channel;
sorting the control channels in ascending order according to the required power; and
allocating transmission power in the sorted order.

19. The method of claim 18, wherein the required power is calculated by using a Forward Link (FL) Signal to Interference and Noise Ratio (SINR) and a target SINR of each control channel.

20. The method of claim 18, further comprising, after the allocating of transmission power:
calculating a sum of power allocated to the control channels;
comparing the power sum and the available power; and
increasing transmission power of each control channel if the available power is greater than the sum of power.

21. The method of claim 20, wherein, in the increasing of transmission power, the transmission power of each control channel is increased using a ratio of the available power and the sum of power.

22. The method of claim 20, further comprising decreasing transmission power of each control channel if the available power is less than the power sum.

23. The method of claim 22, wherein the decreasing of transmission power comprises:
sorting the control channels in ascending order according to a magnitude of allocated transmission power; and
controlling the transmission power of each control channel in the sorted order.

24. The method of claim 23, wherein the controlling of the transmission power comprises:
calculating maximum power $P_{A,m}$ that can be allocated to an $m^{th}$ control channel using $$P_{A,m} = \frac{P_A}{M-m},$$

where m denotes a control channel index, $P_A$ denotes available power in the current time slot, and M denotes a total number of control channels; and
decreasing transmission power of the $m^{th}$ control channel to a smaller value between required power of the $m^{th}$ control channel and the maximum power.

25. The method of claim 14, wherein the regulating of a gain comprises:
mapping a transmission information bit to a signal;
multiplying the mapped signal by the gain value; and
multiplying the gain-regulated signal by a Walsh code allocated to each AT, to generate a control channel signal.

26. The method of claim 14, further comprising:
summing a plurality of channel signals, each of which have undergone the gain regulation, in a chip unit;
repeating the summed signal to generate a Media Access Control (MAC) channel signal; and
transmitting the MAC channel signal in a time slot.

* * * * *